United States Patent [19]

Burkwall, Jr.

[11] 3,974,296

[45] Aug. 10, 1976

[54] SIMULATED EGG AND MEAT PET FOOD

[75] Inventor: Morris P. Burkwall, Jr., Barrington, Ill.

[73] Assignee: The Quaker Oats Company, Chicago, Ill.

[22] Filed: May 20, 1974

[21] Appl. No.: 471,370

Related U.S. Application Data

[63] Continuation-in-part of Ser. No. 234,990, March 15, 1972, abandoned, and a continuation-in-part of Ser. No. 389,477, Aug. 20, 1973, abandoned.

[52] U.S. Cl. .............................. 426/104; 426/335; 426/532; 426/614; 426/646; 426/656; 426/657; 426/805
[51] Int. Cl.² .......................... A23J 1/02; A23J 1/08
[58] Field of Search .......... 426/151, 167, 196, 211, 426/212, 213, 215, 348, 805, 104, 330, 332, 335, 532, 614, 635, 646, 656, 517

[56] References Cited
UNITED STATES PATENTS 3,115,409  12/1963  Hallinan et al. ................ 426/371 X
3,561,972  2/1971   Dodge et al. .................... 426/262
3,640,731  2/1972   Kaplow et al. ................... 426/335
3,694,233  9/1972   Kaplow et al. ................. 426/212 X
3,738,847  6/1973   Bechtel .......................... 426/348

*Primary Examiner*—A. Louis Monacell
*Assistant Examiner*—R. A. Yoncoskie
*Attorney, Agent, or Firm*—Mathew R. P. Perrone, Jr.; Donnie Rudd

[57] ABSTRACT

A simulated egg and meat pet food comprising an egg portion and a meat portion, the egg portion having specified amounts of egg solids, edible water absorbing hydrocolloid, high protein binding agent, water, and either sugar, sugar equivalents or mixtures thereof; with the meat portion having specified amounts of meat or meat by-products, sugar or sugar equivalents or mixtures thereof, vegetable material and moisture with each having a specified pH and water activity.

2 Claims, No Drawings

SIMULATED EGG AND MEAT PET FOOD

CROSS-REFERENCE TO RELATED APPLICATIONS

This application is a continuation-in-part of my previously filed patent specifications now U.S. Ser. No. 234,990, filed Mar. 15, 1972 and now abandoned, and U.S. Ser. No. 389,477 filed Aug. 20, 1973 and now abandoned.

BACKGROUND OF THE INVENTION

1. FIELD OF THE INVENTION:

This invention relates to a simulated egg and meat product. The product is particularly suitable for use as a pet food.

2. DESCRIPTION OF THE PRIOR ART:

Many attempts have been made to produce a mixture of egg and meat for use as a pet food. Generally, these products are some type of canned egg and meat wherein the egg is interdispersed with the meat. However, it has not yet been successfully demonstrated that a combination simulated egg and meat in semi-moist form can be accomplished. Primarily, there has not been the combination simulated egg and meat which would retain its characteristics and yet which would be free from bacteriological degradation. Never before has there been a successful attempt to produce a simulated meat and egg product which maintains its color and is in addition, free from rancidity. The only known attempts of combining these two products in the past have been by utilization of aseptic canning. The product herein claimed overcomes the inefficiencies of the prior art and provides a stable, pleasant tasting, simulated egg and meat product which is highly acceptable as a pet food. It is the particular and unique combination of egg and meat that makes this product particularly desirable.

SUMMARY OF THE INVENTION

It is an object of this invention to provide a simulated egg and meat product which is shelf-stable at room temperature for at least 6 months.

It is another object of this invention to provide a shelf-stable high protein containing simulated egg and meat product particularly adaptable as a pet food.

It is still another object of this invention to provide a process for producing a simulated egg and meat product.

The objects of this invention are accomplished by a simulated egg and meat pet food comprising from 10 to 50 percent by weight simulated egg portion and from 50 to 90 percent by weight simulated meat portion; wherein 100 parts by weight of simulated egg portion comprises from about 1 to about 35 parts by weight egg solids, from about 5 to about 35 parts by weight members selected from the group consisting essentially of sugar, sugar equivalents, and mixtures thereof; from 1 to 30 parts by weight edible water absorbing hydrocolloid; from 10 to 30 parts by weight high protein binding agent; and sufficient water to give a moisture content of from 20 to 40 percent by weight of the simulated egg portion; wherein said simulated egg portion also has a pH of from 4.5 to 7.0 and a water activity, $A_w$, of from 0.7 to 0.90; and wherein 100 parts by weight of said simulated meat portion comprises from 10 to 50 parts by weight meat or meat by-products; from 15 to 40 parts by weight sugar, sugar equivalents, or mixtures thereof; from 10-40 parts by weight vegetable material, and has a moisture content of from 15-40 percent by weight with a pH of from 4.5 to 7.0 and a water activity, $A_w$ of from 0.70 to 0.90.

The objects of this invention are further accomplished by a simulated egg and meat pet food as in Claim 1 wherein the eggs and meat portion have therein an effective amount of an edible antimycotic.

It is preferred that the simulated egg portion of this invention also contain from about 1 percent to about 7 percent edible oil.

In the process for producing the new egg and meat product it is preferred that the egg mixture is heated to a temperature of from about 150°F. to about 230°F. and thereafter formed into the egg shape.

The new and novel egg and meat product of my invention comprises from 10 percent to 50 percent by weight simulated egg portion and from 50 percent to 90 percent by weight simulated meat portion. In my process, 100 parts by weight of the simulated egg portion comprises from about 1 to about 35 parts by weight egg solids, from about 5 to about 35 parts by weight of a member selected from the group consisting essentially of sugar, sugar equivalents, and mixtures thereof, from 1 to 30 parts by weight edible, water absorbing hydrocolloid, from 10-30 parts by weight high protein binding agent, and sufficient water to give a moisture content of from 20-40 percent by weight of simulated egg portion.

The simulated egg portion of this invention includes from about 1 to about 35 percent by weight egg solids. By use herein of the term "egg solids" I intend to mean egg solids as they are known to the industry and as they are now presently commercially available from many various sources. Within the term egg solids I intend to mean dry, whole egg solids having approximately 45 percent protein and approximately 42 percent fat, dried egg yolk having approximately 31 percent protein and approximately 61 percent fat, and dried egg white having approximately 86 percent protein and substantially free of fat. I also intend to include frozen eggs, frozen egg whites, frozen egg yolks, and/or combinations thereof as long as the moisture content thereof does not cause the moisture of the final product to exceed the stated critical ranges. The simulated egg portion of this invention must include from about 5 percent to about 35 percent by weight of a member selected from the group consisting essentially of sugar, sugar equivalents, and mixtures thereof. By use herein of the term "sugar" I intend to mean any saccharide which is soluble in water to an extent that the osmotic pressure of the water solution of such a saccharide provides the requisite bacteriostatic effect. In addition the saccharide is required to be non-toxic. The saccharide must not provide any undesirable taste effects when used in the required concentration. It is preferred that the sugar be a low molecular weight sugar since sugars of the low molecular weight have a more pronounced effect in increasing the osmotic pressure of a sugar solution that do sugars of a higher molecular weight. Among the sugars that may be used for this invention are the reducing and non-reducing water soluble monosaccharides; the reducing and non-reducing polysaccharides and their degradation products such as pentoses, aldopentoses, methylpentoses, ketopentoses, e.g., xylose and arabinose, rhamnose hexoses, and reducing polysaccharides; aldo hexoses like glucose, galactose, and mannose; the keto hexones including fructose and sorbose; and disaccharides including maltose and lactose; the non-reducing dissaccharides such as sucrose; and other polysaccharides such as dextrin and raffinose and hydrolyzed starches which contain as their constituents oligosaccharides.

By use of the term "sugar equivalents" I intend to mean a compound which can be added to the mixture to produce the same effect on osmotic pressure as would sugar. Generally the sugar equivalents include the polyhydric alcohols which are nontoxic and which do not adversely affect the taste in the concentrations specified. By the term "polyhydric alcohols" I generally intend to mean alcohols with three or more hydroxyl groups and having the general formula $HOCH_2(CHOH)_mCH_2OH$ where m is a number from 1–5. I also intend to cover as a polyhydric alcohol, 1,3-butylene glycol and propylene glycol. Generally, these polyhydric alcohols are water soluble, have small optical rotation in water and have some sweetness to taste. Among the polyhydric alcohols that may be used in this invention are the following:

Tritols
  glycerol
Tetritols
  erythritol
  D-threitol
  L-threitol
  D,L-threitol
Pentitols
  ribitol
  xylitol
  D-arabitol
  L-arabitol
Hexitols
  allitol
  dulcitol
  sorbitol (D-glucitol)
  L-glucitol
  D,L-glucitol
  D-mannitol
  L-mannitol
  D,L-mannitol
  D-talitol
  L-talitol
  D,L-talitol
  D-iditol
  L-iditol
Heptitols
  glycero-gluo-heptitol
  D-glycero-D-ido-heptitol
  perseitol
  volemitol
Octitol
  D-erythro-D-galacto-octitol The term sugar equivalent also includes the higher sugar alcohols. Glycerol and propylene glycol are acceptable sugar equivalents and are particularly useful in this invention. As used herein, the product should contain sugar or sugar equivalents or mixtures thereof. When using mixtures of the sugar and sugar equivalents, care must be taken to insure that the amount used reduces the osmotic pressure of the product to the extent that it imparts therein a bacteriostatic effect.

The egg portion of this invention also contains from about 1 percent to 30 percent by weight edible water absorbing hydrocolloid. By use herein of the term, "edible water absorbing hydrocolloid", it is intended to mean a hydrocolloid which can absorb from at least one to 20 times its weight in water. It includes starches, polysaccharide gums, pectin and other gelling agents.

By use of the term starch, it is intended to mean both modified and unmodified starch, both waxy and non waxy starch, both regular and high amylose starch, and both grain and tuber starch. The starch can be acid treated or oxidized to make it thin boiling. It can be pregelatinized prior to inclusion in the process or ungelatinized when added and then gelatinized in the process. It can be cross-linked with a cross-linking agent such as sodium trimeta phosphate, epichlorohydrin, phosphorousoxichloride, or alkalating agents such as propylene oxide or acelating agents such as acetic anhydride.

Any of the common commercial starches are acceptable for use in this invention. I have found it particularly acceptable to use a pregelatinized tapicoa starch but this invention is not limited to tapioca as the only type of starch since other types of starch such as corn starch, wheat starch, wheat flour, waxy maize starch, etc., are also acceptable. By use herein of the term "gelatinized" with reference to starch, I intend to mean starch or starch containing flour that is gelatinized prior to addition to the mix or else is particularly or slightly gelatinized prior to addition to the mix and then gelatinized by the processing conditions. I may also use ungelatinized starch which is gelatinized in the process in a time sufficient to impart the properties achieved by pregelatinization of the starch.

By use of the term "polysaccharide gum" it is intended to include both true gums of vegetable origin and synthetic gums such as carboxymethylcellulose, methyl cellulose, and other cellulose derivatives which approximate the vegetable gums in physical and chemical properties. Both types of gums are acceptable for use in this invention.

"True gums" are gums of vegetable origin which are soluble in water or swell in contact with water to form viscous colloidal solutions. They are insoluble in oils, alcohol, benzene and other organic solvents.

A general classification of such gums is as follows:

A. Plant gums — dried extrudates from certain trees or shrubs in the form of tears, flakes or annular fragments that have been formed by bark fissures or incisions. The more important ones include acacia (gum arabic), Australian, Cape, carmania, gedda, ghatti, karaya, mesquite, mogadore, Persian, shiraz, talha and tragacanth. Others of lesser importance include amrad, angico, apricot, brea, cashew, cebil, cedar, chagual, cherry, damson, jeol, mango, plum and sassa.

B. Plant musilages — derived from seeds, roots or other plant parts usually by extraction with water. The class includes gums derived from althea root, chia seed, Iceland moss, linseed (flaxseed), slippery elm bark and guar gum.

C. Mucilaginous materials known as hydrophylic colloids obtained from two general groups of brown and red algae. This class includes agar, Irish moss (carrageen) and algin.

When the source material for the gum is acidic, i.e., algin and Irish moss, the commercially available edible gum is a derivative of the acid such as a soluble salt or ester, i.e. propylene glycol ester of alginic acid in general, to be satisfactory, any gum employed must be edible, have no undesirable flavor, and disperse rapidly in hot water.

This invention also includes the use of such gelling agents as pectin.

The simulated egg portion of this invention also includes from 10–30 percent by weight of a high protein binding agent, i.e. a high protein material that both absorbs or binds water as well as imparts an adhesive or binding function in the mixture. The high protein binding agent should have a protein content which when combined with the protein content of the other ingredients provides at least about 10 percent to at least about 30 percent by weight, and preferably from 15 percent to 25 percent by weight, protein in the finished product. It is generally preferred to use, as a binding agent, soybean flour which has been concentrated to provide in the flour at least 50 percent by weight protein. I also find it particularly acceptable to use soy protein concentrates (70 percent protein) and soy protein isolate (90 percent protein). Any of the known high protein binding agents may be used in place of soy flour, however, including such things as casein, caseinate salts, albumin and whey. Also acceptable as high protein binding agents are non-fat milk solids, cereal proteins such as wheat gluten and corn flour, and the common oil seed proteins, such as cottonseed, peanut protein etc.

The simulated egg portion of this invention contains from 20-'percent by weight water, as a final moisture content. Although the water content of this product is generally expected to result in serious bacteriological problems, it has been essentially eliminated by the use herein of the sugar, sugar equivalents, and mixtures thereof to provide a bacteriostatic effect.

The simulated egg portion of this invention must have a pH of from 4.5 to 7.0. The pH of the product may be adjusted to this level by adding therein any edible food grade non-toxic acid which can be adjusted to the $H^+$ ion concentration to the desired level. Examples of suitable pH adjusters are lactic acid, citric acid, acetic acid, tartaric acid, hydrochloric acid, sulfuric acid, phosphoric acid, and acid salts such as monobasic sodium phosphate. Both organic and inorganic acids may be used as well as mixtures of the two types of acids. It is critical that the pH of the product fall within the required range. Also, it is necessary in this product that the water activity of the product fall within the range of 0.70 to 0.90. The use of the term "water activity" is generally known within the semi-moist pet food art and is to be considered in its normal usage.

In addition to the fat that is already present in the ingredients, it is sometimes desirable to add, in the simulated egg portion of this invention, an additional 1 percent to 7 percent by weight of an edible fat or oil to increase the fat content of the product. The term "edible fat or oil" used herein refers to the common usage of the term including those that are solid and those that are liquid at room temperatures. The fat may be added by utilization of a high fat content egg.

The new and novel simulated egg and meat pet food that I have invented must include from 50–90 percent by weight simulated meat portion. 100 parts by weight of the simulated meat portion of this invention comprises from 10 to 50 parts by weight meat or meat by-products, with from 15–40 parts by weight sugar, sugar equivalents or mixtures thereof, and from 10–40 parts by weight vegetable or vegetable material, and has a moisture content of from 15–40 percent by weight. In addition the simulated meat portion of the product must have a pH of from 4.5 to 7.0 and a water activity, $A_w$, from 0.70 to 0.90. The meat or meat by-products which may be used in the meat portion of this invention includes any desired cut of meat and meat by-products or variety of meat as well as poultry by-products and fish or fish by-products. Commonly, the component which contributes much of the flavor appeal will be beef and will be a by-product such as beef tripe, trimmings, etc. It is intended to include such things as bone meal and meat meal within the definition of meat by-products.

The meat content of the product will form a matrix with which the other components will be combined. In processing to form the meat portion the meat should desirably be finely divided or slurried before inclusion in the product.

The water content of the meaty portion must be sufficient to impart plasticity to the formed product. It is necessary to have at least 15 percent by weight water and no more than about 40 percent by weight water. If less than 15 percent by weight water is utilized, then the product will be devoid of its plasticity properties which are desirable in making an acceptable product. If too high of a moisture content is utilized, such as a moisture content above 40 percent by weight, then the product will become too mushy, will not be formable properly, and will be unstable to bacteriological degradation.

The "sugar, sugar equivalents, or mixtures thereof" utilized in the meat portion of this invention are the same sugar, sugar equivalents and mixtures thereof utilized in the simulated egg portion of this invention.

It may also be desirable in both the simulated egg and simulated meat portions of this invention to include an effective amount of antimycotic. A preferred amount of antimycotic may vary but typically it may be about 0.3 percent of the total weight. Of particular use as antimycotics are potassium sorbates or other sorbate salts such as potassium and calcium sorbate. Antimycotics which can be used are benzoic acid, sodium benzoate, propionic acids, sodium and calcium propionate, sorbic acid, 1,3-butanediol propylene glycol, and diethylpyrocarbonate.

The meaty portion of my invention also includes from 10–40 parts by weight of vegetable material for each 100 parts by weight of simulated meat. The desired vegetable material is a soybean protein concentrate but the vegetable material need not be a protein concentrate since lower levels of protein are acceptable. In other words, both the high protein binding agents heretofore mentioned and low protein binding agents may be used in the meat portion of this invention. The protein concentrate raises the total protein level of the mixture to the desired nutrative level while simultaneously contributing to the water absorbant properties in the appearance of the product. Vegetable protein concentrates which may be used to include oil seeds and legumes. Typical vegetable protein concentrates include any flakes, as well as soy concentrates and isolates, and concentrates derived from cottonseed, peanuts, flax seed, beans, etc. Other vegetable materials include soy meal, soy flour, and soy grits.

The preferred vegetable protein concentrate is soy flour or soy grits mixed with 1–2 percent soy hulls. These materials in addition to their contribution to the nutritional content of the product and development of the water absorption and plastic properties, may also provide a desirable appearance by forming in the product whitish fat-like spots which when viewed with a predominantly red body above the material produces an appearance very closely resembling ground beef containing natural fat. Typically, the vegetable protein concentrate may be admixed with a lesser protein containing constituent, such as a flour, for instance the vegetable protein material or vegetable material may be a mixture of soy flakes and soy flour along with soy hulls.

The process for producing my new and novel product comprises first preparing a simulated egg portion by admixing from 1 to 35 parts by weight egg solids with from about 5 to about 35 parts by weight of a member selected from the group consisting essentially of sugar, sugar equivalents, and mixtures thereof, from 1–30 parts by weight edible water absorbing hydrocolloid, from 10–30 parts by weight high protein binding agent, and sufficient water to give a moisture content of from 20–40 percent by weight of the simulated egg portion, with the simulated egg portion having a pH of from 4.5 to 7.0 and a water activity, $A_w$, of from 0.70 to 0.90, then heating the mixture to plasticize the mixture, and thereafter forming the mixture into an egg-appearing shape. Secondly, the process comprises forming a meat portion by admixing in each 100 parts, from 10–50 parts by weight meat or meat by-products, from 15–40 parts by weight sugar, sugar equivalents or mixtures thereof; from 10–40 parts by weight vegetable material; and sufficient moisture to have a moisture content from 15–40 percent by weight with said simulated meat portion having a pH of from 4.5 to 7.0 and a water activity, $A_w$, of from 0.70 to 0.90. After the components of the meaty portion are admixed, the mixture should be pasteurized at a temperature of from about 180°F. to 212°F. for from about 1–10 minutes to kill bacteria and produce a liquified meat. The mixture can then be formed into a meaty shape. A preferable processing is forming the simulated meat into small strands which may resemble hamburger meat. After the simulated egg and meat portions are produced, they are then admixed in an amount of 10–50 percent by weight simulated egg with from 50–90 percent by weight simulated meat. The product may then be packaged as a shelf-stable, pet food.

DESCRIPTION OF THE PREFERRED EMBODIMENTS

The following examples may be taken to constitute embodiments of this invention, although the invention is not limited to the embodiments illustrated:

EXAMPLE 1

A simulated egg portion was prepared by admixing the following: (parts refer to parts by weight).
5.0 parts whole egg solids
20.0 parts sugar and sugar equivalents (15 parts sucrose, 5 parts propylene glycol)
18.0 parts pregelatinized tapioca starch
24.0 parts high protein binding agent (10 parts of a 50 percent protein soy flour 8 parts of a 70 percent protein concentrate 5 parts of a sodium caseinate 1 part dried whey)
4.0 parts salts, vitamins, minerals and special coloring
0.3 parts potassium sorbate
0.7 parts phosphoric acid
28.0 parts water After the ingredients were thoroughly mixed the mixture was placed in an extruder wherein the mixture was heated to about 185°F., and the heated mixture was then extruded into small strands.

A simulated meat portion was produced by admixing:
25 parts by weight beef tripe
25 parts by weight sucrose
16 parts by weight soy grits
16 parts by weight soy flour
9.7 parts by weight meat by-products (beef intestines)
4 parts by weight propylene glycol
0.3 parts by weight potassium sorbate
4 parts by weight salt, vitamins and minerals sufficient water to bring the moisture content to about 27 percent by weight.

The mixture was then heated to about 185°F. and extruded into small strands. Next, 40 parts by weight of the simulated egg were admixed with 60 parts by weight of the simulated meat. The resulting product was a highly acceptable simulated egg and meat pet food product.

EXAMPLE 2

Example 1 was repeated except 25 parts by weight egg solids was used, the starch reduced to 12 parts by weight, and the high protein binding agent reduced to 10 parts by weight, in the simulated egg portion. Again, the resulting overall product was highly acceptable.

EXAMPLE 3

Example 1 was repeated except that 5 parts by weight of the beef tripe was replaced with 5 parts by weight soy flour in the simulated meat portion. Again, the overall product was highly acceptable as a pet food.

EXAMPLE 4

Example 1 was repeated except that 10 parts by weight of the egg portion were admixed with 90 parts by weight of the simulated meat portion. Again, the resulting product was a highly acceptable pet food.

EXAMPLE 5

Example 1 was repeated except that equal parts of simulated egg portion and simulated meat portion were admixed. Again, the resulting product was a highly acceptable pet food.

EXAMPLE 6

Example 1 was repeated except the tapioca starch in the egg portion was replaced with 10 parts by weight egg solids and six parts by weight soy flour and 2 parts by weight guar gum. Again, the resulting product was a highly acceptable pet food.

EXAMPLE 7

Example 2 was repeated except the tapioca starch in the egg portion was replaced by 2 parts by weight guar gum and 10 parts by weight soy flour. Again, the resulting product was highly acceptable.

The critical amounts of simulated egg and simulated meat portions are important to this invention. If one goes too low in egg portion, then the resulting product cannot be properly recognized as an egg product. If one goes too high in egg portion the product becomes unacceptable as an animal food and does not retain its meaty characteristics. It is this unique blend of egg and meat, even though simulated, that makes a highly desirable pet food product.

The particular advantages of the product of this invention are numerous. First, the product is shelf-stable at room temperature for up to 6 months with substantially full retention of aroma and taste. While some food products have a certain degree of shelf stability, none of them approach the product of this invention for stability with substantial retention of aroma and taste. Another important advantage of this product is that it is highly nutritious and high protein containing product which can supply the dietary requirements of pets at a low cost. Still another important advantage of this product is that it provides the first shelf-stable, highly nutritious, simulated egg product that does not need to be aseptically canned.

Having fully described my new and unique invention, I claim:

1. A shelf-stable, simulated egg and meat pet food comprising from 10 to 50 percent by weight simulated egg portion and from 50 to 90 percent by weight simulated meat portion:
 a. wherein 100 parts by weight of simulated egg portion comprises
  I. from about 1 to about 35 parts by weight egg solids,
  II. from about 5 to about 35 parts by weight of a member selected from the group consisting of sugar, sugar equivalents, and mixtures thereof,
  III. from 1 to 30 parts by weight edible water absorbing hydrocolloid,
  IV. from 10 to 30 parts by weight high protein binding agent,
  V. sufficient water to give a moisture content of from 20 to 40 percent by weight of the simulated egg portion,
  VI. a sufficient amount of an acidic compound selected from the group consisting of at least one edible, food-grade, non-toxic acid; at least one edible food-grade, non-toxic acid salt; and mixtures thereof to adjust the pH of said simulated egg portion to 4.5 to 7.0, and
  VII. an effective amount of an antimycotic,
  VIII. wherein said simulated egg portion has the shape of small strands and a water activity, $A_w$, of from 0.70 to 0.90; and
 b. wherein 100 parts by weight of said simulated meat portion comprises
  I. from 10 to 50 parts by weight meat or meat by-products,
  II. from 15 to 40 parts by weight of a member selected from the group consisting of sugar, sugar equivalents, and mixtures thereof,
  III. from 10 to 40 parts by weight vegetable material, and
  IV. a sufficient amount of an acidic compound selected from the group consisting of at least one edible, food-grade, non-toxic acid; at least one edible food-grade, non-toxic acid salt; and mixtures thereof to adjust the pH of said simulated meat portion to 4.5 to 7.0, and
  V. an effective amount of an antimycotic,
  VI. wherein said simulated meat portion has a moisture content of from 15–40 percent by weight and a water activity, $A_w$, of from 0.70 to 0.90, and a shape of small strands resembling hamburger meat.

2. A process for producing a shelf-stable, highly nutritious, simulated egg and meat pet food comprising:
 a. first preparing a simulated egg portion by admixing to form a first mixture
  I. from 1–35 parts by weight egg solids,
  II. from about 5 to about 35 parts by weight of a member selected from the group consisting of sugar, sugar equivalents, and mixtures thereof,
  III. from 1–30 parts by weight edible water absorbing hydrocolloid,
  IV. from 10–30 parts by weight high protein binding agent,
  V. sufficient water to give a moisture content of from 20–40 percent by weight,
  VI. a sufficient amount of an acidic compound selected from the group consisting of at least one edible, food-grade, non-toxic acid; at least one edible food-grade, non-toxic acid salt, and mixtures thereof to adjust the pH of said first mixture to 4.5 to 7.0, and
  VII. an effective amount of an antimycotic
  VIII. with the first mixture having a water activity, $A_w$, of 0.70 to 0.90;
 b. thereafter heating the first mixture to render it plastic; and
 c. then forming the first mixture into an egg appearing shape of small strands to form said simulated egg portion;
 d. forming a simulated meat portion by admixing to form a second mixture
  I. from 10–50 parts by weight meat or meat by-products,
  II. from 15–40 parts by weight of a member selected from the group consisting of sugar, sugar equivalents, and mixtures thereof,
  III. from 10–40 parts by weight vegetable material,
  IV. sufficient water to provide a moisture content of from 15–40 percent by weight,
  V. an effective amount of an antimycotic, and
  VI. a sufficient amount of an acidic compound selected from the group consisting of at least one edible, food-grade, non-toxic acid; at least one edible food-grade, non-toxic acid salt; and mixtures thereof to adjust the pH of said second mixture to 4.5 to 7.0,
 e. forming the second mixture into a meat appearing shape of hamburger-like small strands to form said simulated meat portion, said simulated meat portion having a water activity, $A_w$, of from 0.70 to 0.90; and
 f. admixing from 10–50 parts by weight of said simulated egg portion with from 50–90 parts by weight of said simulated meat portion to create said shelf-stable, highly nutritious, simulated egg and meat pet food.

* * * * *